United States Patent [19]

Reuschenbach et al.

[11] 4,307,874
[45] Dec. 29, 1981

[54] GAS SPRING WITH MEANS FOR RETAINING PISTON ADJACENT ONE TERMINAL POSITION

[75] Inventors: Hermann Reuschenbach, Neuwied; Rolf Langanke, Boppard, both of Fed. Rep. of Germany

[73] Assignee: Stabilus GmbH, Koblenz-Neuendorf, Fed. Rep. of Germany

[21] Appl. No.: 89,137

[22] Filed: Oct. 29, 1979

[30] Foreign Application Priority Data

Nov. 3, 1978 [DE] Fed. Rep. of Germany ....... 2847728

[51] Int. Cl.³ ............................. F16F 9/02; F16F 9/48
[52] U.S. Cl. .................................. 267/64.15; 188/284; 188/300; 267/120; 267/124
[58] Field of Search ................ 267/65 R, 64 R, 64 B, 267/8 R, 8 A, 120, 124; 188/300, 284, 269, 281, 282, 317, 316, 314, 315; 16/66

[56] References Cited

U.S. PATENT DOCUMENTS

| 4,045,008 | 8/1977 | Bauer | 267/120 |
| 4,113,071 | 9/1978 | Müller et al. | 188/300 X |
| 4,156,523 | 5/1979 | Bauer | 267/120 |
| 4,166,612 | 9/1979 | Freitag et al. | 267/65 R |

FOREIGN PATENT DOCUMENTS

| 1015327 | 9/1957 | Fed. Rep. of Germany. |
| 1920059 | 10/1970 | Fed. Rep. of Germany. |
| 2353888 | 5/1974 | Fed. Rep. of Germany. |
| 2800345 | 7/1979 | Fed. Rep. of Germany. |
| 1382140 | 8/1963 | France ................. 267/120 |

*Primary Examiner*—Douglas C. Butler
*Attorney, Agent, or Firm*—Brumbaugh, Graves, Donohue & Raymond

[57] ABSTRACT

In the illustrative embodiments described, the two compartments of the cylinder cavity of a gas spring of the piston-and-cylinder type, separated by a piston assembly, are connected by first and second passages extending across the piston. A valve arrangement on the piston assembly opens the second passage in response to movement of the piston assembly towards a terminal position in the cylinder and closes the second passage in response to movement of the piston assembly away from the terminal position. The first passage is open at all positions of the piston assembly remote from the terminal position. Releasable locking structure in the cylinder is operable to close the first passage as the piston assembly approaches the terminal position, thereby to hold the piston assembly in such terminal position until the locking force is manually overridden.

19 Claims, 3 Drawing Figures

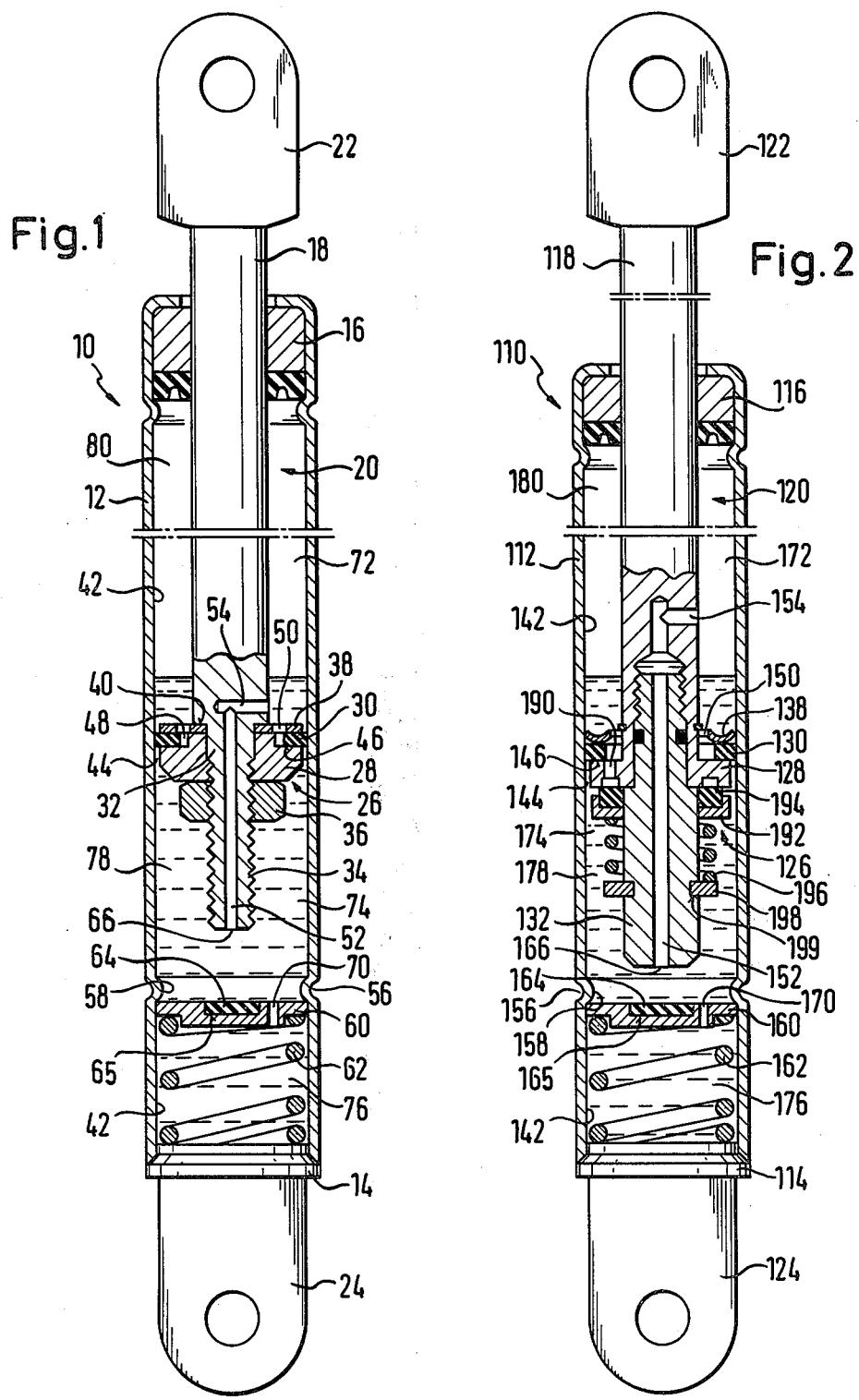

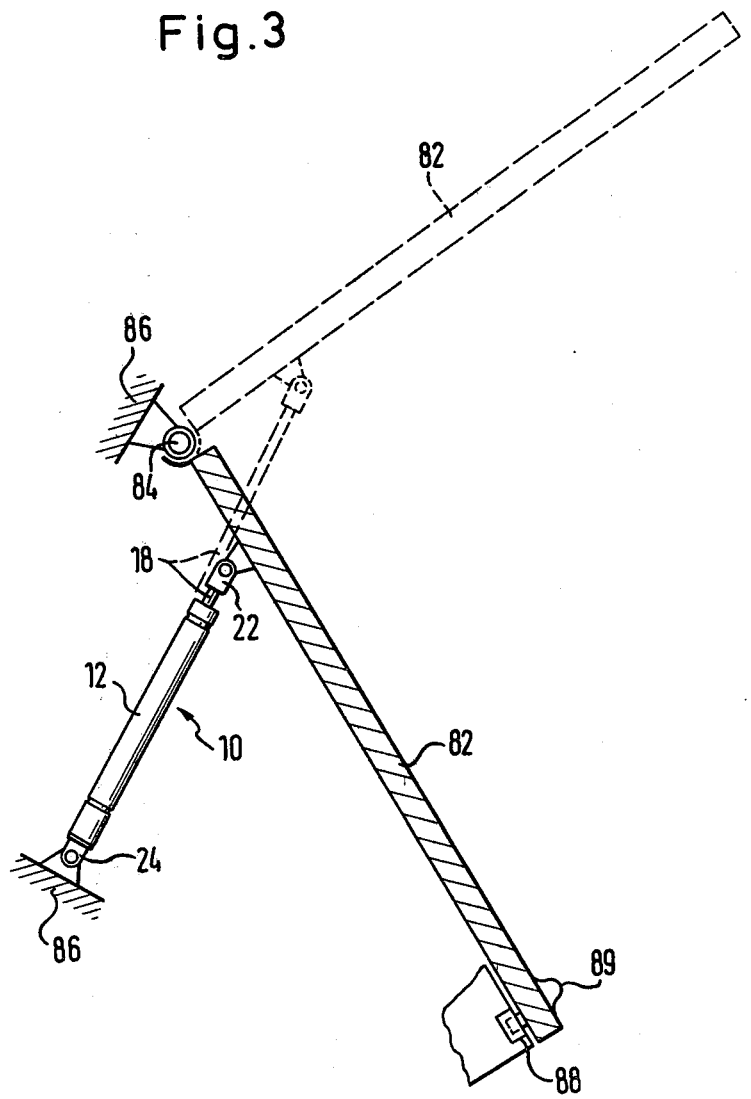

GAS SPRING WITH MEANS FOR RETAINING PISTON ADJACENT ONE TERMINAL POSITION

BACKGROUND OF THE INVENTION

1. Field of the Invention

This invention relates generally to gas springs and like devices and, more particularly, to improved devices of the piston-and-cylinder type in which the piston rod may be automatically, and releasably, locked in position adjacent one end of its stroke against a force tending to expel the piston rod from the cylinder.

2. The Prior Art

Gas springs of the general type referred to above are disclosed in the commonly-owned U.S. Pat. No. 4,166,612, issued Sept. 4, 1979, and also in the copending, commonly-owned U.S. application Ser. No. 55,826, filed July 9, 1979.

Although the gas springs as there disclosed afford advantages and improved results relative to previously used devides, it is desirable to provide still further improvements in the construction and operation thereof, particularly in respect of the reliability and performance of the locking structure of the units and of the ease and cost of manufacture and assembly of the units.

SUMMARY

The foregoing and other objects are attained, in accordance with the invention, by providing, in a piston-and-cylinder device, an improved locking structure for releasably holding the piston assembly at a terminal position. In a preferred embodiment, the improved locking structure includes (1) a first passage extending across the piston and having an opening directed towards that end of the cylinder which is nearer to the piston assembly when the piston assembly is in the terminal position and (2) a sealing member located in the cylinder in substantially axial alignment with that opening for closing the opening and preventing fluid flow across the piston when the piston assembly approaches the terminal position. A resilient support, e.g. a coil spring, is provided for resiliently urging one of the opening-defining member or the sealing member towards the other member, whereby the sealing member abuts and closes off the opening to the first passage under the action of the resilient support when the piston assembly approaches, but before it reaches, the terminal position.

In accordance with the invention, therefore, the locking structure is very simple in design. The requirements as to the precision of manufacture are considerably reduced, because essentially no sliding movement between the opening member and the abutment member need occur. Nevertheless, the locking means are operable over a relatively great range of terminal positions.

As in the gas springs disclosed in U.S. Pat. No. 4,166,612, the device of the present invention likewise includes a second passage connecting the two cylinder compartments separated by the piston. For rapidly closing this passage upon the initiation of movement of the piston assembly away from the terminal position, it is proposed, according to a further feature of the invention, that the second passage be defined by a gap between the piston assembly and the inner cylindrical face of said cylinder and that the valve means for controlling flow through the second passage comprises a circular valve member which engages the inner cylindrical face of the cylinder and which also axially engages a supporting face of the piston assembly. This supporting face preferably lies in a plane substantially perpendicular to the axis of the cylinder and faces in the direction away from the terminal position. A spring member is provided on the piston assembly for resiliently biasing the circular valve member into contact with the supporting face, thus closing the second passage when the piston assembly is moved away from the terminal position, but for permitting the circular valve member to be lifted from the supporting face against the biasing action of the spring member to open the second passage when the piston assembly is moved towards the terminal position. This valve action permits relatively free movement of the piston assembly towards the terminal position under an externally applied force, but inhibits movement of the piston assembly away from the terminal position.

According to another feature of the invention, still further control of the holding or locking force which acts on the piston assembly in the terminal position, as a value independent of the design parameters of the first passage and of the aforementioned locking structure associated therewith, may be provided in the form of additional locking structure including a third passage across the piston and an associated pressure relief valve. The pressure relief valve is made responsive to axial force applied to the piston rod tending to move the piston assembly in a direction away from the terminal position, and is arranged to open, upon application of sufficient axial force, while the aforementioned first and second passages are closed. If desired, the relief valve structure may be combined with the valve structure associated with the second passage as, for example, by use of a common valve member.

BRIEF DESCRIPTION OF THE DRAWINGS

For a further understanding of the invention, reference may be made to the following description of exemplary embodiments thereof, taken in conjunction with the figures of the accompanying drawings, in which:

FIG. 1 is a longitudinal sectional view of a first embodiment of the invention;

FIG. 2 is a longitudinal sectional view of a second embodiment of the invention; and FIG. 3 illustrates the arrangement and use of a gas spring according to the invention in a specific application, e.g. in a motor vehicle.

DETAILED DESCRIPTION

In FIG. 1, a gas spring, designated generally at 10, includes a cylinder 12 which is closed at its axially inner end by a plug 14. At the other, outer end of the cylinder, there is provided a guiding and sealing unit 16, through which a piston rod 18 is introduced into the sealed cavity 20 defined within the cylinder 12. The piston rod 18 and the plug 14 are provided with fastening elements 22 and 24, respectively, by which the gas spring can be mounted in use, as, for example, by pivotal connection to two relatively movable parts, e.g. the body and trunk lid, of a vehicle. The piston rod 18 is provided with a piston assembly generally designated at 26. This piston assembly 26 includes a piston 28 and a circular piston ring 30. The piston 28 is mounted on an extension 32 of the piston rod 18, which extension is provided with an exterior thread 34, and is axially fixed thereon by a nut 36. A spring 38 shaped as a disc is provided between the piston 28 and a shoulder face 40 of the piston rod 18.

The outer diameter of the piston 28 is preferably slightly less than the inner diameter of the inner cylindrical face 42 of the cylinder 12, so that a gap 44 is defined by the piston 28 and the cylindrical inner face 42. The piston 28 is further provided with an axially-directed supporting face 46, which defines a circular groove 48 together with the disc-type spring 38. As shown, the piston ring 30 is received within the groove 48 but does not completely fill it in the radial direction. The disc-type spring 38 is provided with axial holes 50, for a purpose described later. An axial bore 52 in the extension 34 and a radial bore 54 in the piston rod 18 define a first passage 52, 54 extending across the piston assembly.

Adjacent the lower end of the cylinder as shown in FIG. 1, a circular restriction 56 in diameter is provided in the cylinder wall, thereby forming an inward projection projecting from the inner cylindrical face 42. A disc-shaped sealing member 60 is guided by the inner cylindrical face 42 of the cylinder 12 below the projection 58. A helical compression spring 62 urges the disc-shaped sealing member 60 against the inner projection 48, which, as will be appreciated, thereby defines a rest or abutment position of the sealing member. A sealing pad 64 is provided in a recess 65 formed in the upper face of the sealing member 60. This sealing pad is in axial alignment with the lower opening 66 of the bore 52, the extension 32 being understandable as an opening member provided with the opening 66. The sealing member 60 also is provided with an axial bore 70 at a position radially outward of the sealing pad 64.

The piston assembly 28 separates the cavity 20 into a first, axially outer, compartment 72 and a second, axially inner, compartment 74. The chamber 76 below the sealing member 60 is in fluid connection with the second compartment 74 via the bore 70 and acts as a part thereof. The cavity 20 is partially filled with a liquid 78, such as a typical hydraulic oil. The remainder of the cavity 20 is filled with a gas 80, e.g. air or nitrogen, suitably at superatmospheric pressure. As will be understood from FIG. 1, the two cylinder compartments 72 and 74 are interconnected by the first passage 52, 54 as long as the opening 66 is remote from the sealing pad 64.

In operation of the embodiment of FIG. 1, so long as the opening 66 is remote from the sealing pad 64 the two compartments 72 and 74 will always be in fluid connection with each other via the passage 52, 54. Due to the pressure of the pressurized gas 80, the piston rod 18 and the piston assembly 26 are biased in a direction outward from the cavity 20 of the cylinder, i.e., in the upward direction in FIG. 1. The biasing force corresponds to the product of the cross section of the piston rod 18 and the pressure of the pressurized gas. Thus, when the piston rod 18 moves upwards as regarded in FIG. 1 with respect to the cylinder 12, i.e., axially outward, due to this biasing force or when the piston rod is moved downward in FIG. 1 with respect to the cylinder 12, i.e. axially inward, by an outward force against said biasing force, fluid can flow from the first compartment 72 into the second compartment 74 or from the second compartment 74 into the first compartment 72, respectively, through the first passage 52, 54.

Upon downward movement of the piston rod 18 with respect to the cylinder 12 as seen in FIG. 1, the piston ring 30, which is in frictional engagement with the inner cylindrical face 42, is lifted from the supporting face 46 against the action of the disc-type spring 38, so that the gas 80 or the liquid 78, as the case may be depending on the position of the piston 28 within the cylinder 12, can also pass through a second passage defined by the gap 44, a further gap defined between the supporting face 46 and the piston ring 30 due to the lifting of the piston ring from the supporting face 46, the clearance between the inner circumference of the piston ring 30 and the bottom of the groove 48, and the holes 50 in the disc-type spring 38. This second passage is in parallel with the first passage 52, 54 when the piston rod 18 moves downward as seen in FIG. 1, so that the downward movement is less damped than the upward movement.

As the piston assembly 26 approaches its lower terminal position as seen in FIG. 1, the opening 66 of the opening member 34 comes into engagement with the sealing pad 64 and the first passage 52, 54 is thereby closed. The position at which the opening 66 and the sealing pad 64 first engage is designated as the abutment position. As the piston assembly moves further downward beyond the abutment position, the disc-shaped sealing member 60 is moved downward against the action of the helical compression spring 62. During such movement, the liquid in chamber 76 escapes to the second compartment 74 through the bore 70. Upon release of the external force acting to move the piston assembly downward against the biasing action of the pressurized gas 80, the piston assembly 26 and the piston rod 18 are held or locked in the terminal position at which the external force has ceased. This holding or locking action occurs as a result of the first passage defined by the bores 52, 54 being closed by the sealing pad 64 and the second passage defined by the gap 44, etc., being closed because the piston ring 30 returns to sealing engagement with the supporting face 46 due to the action of the disc-type spring 38. Hence, no fluid can flow from the compartment 72 into the compartment 74. After even a very small upward movement of the piston rod 18 as seen in FIG. 1, therefore, the pressure of the pressurized gas within the compartment 72 acting on the piston assembly 26 increases and the pressure within the compartment 74 acting on the piston assembly 26 decreases, with the result that the upward movement of the piston rod 18 is stopped as long as no external traction force draws the piston rod 18 upward. The piston rod 18 and the piston assembly 26 will thus be held in the lower terminal position independently of the extent to which the sealing member 60 has been pushed downward by the preceding downward movement of the piston rod 18. This locking force may, however, be overcome by the application of an upwardly-directed external force on the piston rod 18. The locking force is overcome when the pressure in the upper compartment 72, which pressure is increased by the upwardly directed force on the piston rod 18, is increased to such an extent that the sealing member 60 can be lifted from the opening 66 against the action of the helical compression spring 62.

For illustrative purposes, FIG. 3 depicts the use of the gas spring embodiment thus far described in a motor vehicle. As there shown, a lid 82, e.g. a trunk, hatchback or hood lid, is pivotably mounted about a horizontal axis 84 to a car body 86. The gas spring cylinder 12 is pivotably mounted by its fastening element 24 to the car body 86 and the piston rod 18 is connected by its fastening element 22 to the lid 82. The lid 82 is shown in full lines in its closed position in which it is locked by a lock 88. Upon release of the lock 88, the lid 82 can be opened by pivoting it in an upward direction about the horizontal axis 84 to the position shown in dashed lines.

This upward swinging movement of the lid 82 is assisted by the gas spring 10. One can see in FIG. 3 that in the closed position of the lid 82 the piston rod 18 is approximately at its innermost position with respect to the cylinder 12, i.e., in a terminal position at which the opening 66 as shown in FIG. 1 is closed by the sealing pad 64. Therefore the holding or locking action exists as described above, and the lid 82 therefore will not be biased upward by the gas spring 10 as long as it is in the closed position as shown in FIG. 3. This is a great advantage because no inner stresses in the lid 82 are generated by the gas spring 10 while the lid is closed. This is particularly advantageous where, for example, the lock 88 is located centrally of the transverse width of the lid and only a single gas spring 10, located at an end of the lid, is provided. If, in such an arrangement, the biasing force exerted by the pressurized gas would be unchecked, the biasing force would introduce bending moments into the lid 82 and heavy stresses would result both in the pivoting connection 84 and in the lock 88. Other applications of gas springs where suspension of the outward biasing force of the spring in the inner terminal position of the piston rod is advantageous will be readily apparent to those skilled in the art.

Except as otherwise noted, the embodiment shown in FIG. 2 substantially corresponds in structure and operation to the embodiment of FIG. 1. Corresponding parts have therefore been designated in FIG. 2 by the same reference numbers, increased by 100. For brevity, however, only those parts relevant to the differences between the two embodiments are discussed below. In the embodiment of FIG. 3, a third passage across the piston assembly 126 is defined in part by a bore 190 through the piston 128. The bore 190 is normally closed by an annular closing member 192, which is provided with a sealing ring 194. The sealing ring 194 closes the bore 190 at its lower end as shown in FIG. 2. The annular closing member 192 is biased upward against the lower face of the piston 128 by a further helical compression spring 196, which is supported by a supporting ring 198 engaging a groove 199 in the opening member 132.

In operation of the embodiment of FIG. 2, when the piston rod 118 has reached its lower terminal position, i.e., in which the opening 166 is closed by the sealing pad 164 so that the holding or locking effect exists, the further passage 190 is also closed as long as no upwardly directed force is exerted on the piston rod 118. When, however, a predetermined upwardly directed force is exerted on the piston rod 118, the further passage 190 is opened because the annular closing member 192 is lifted downwardly from the piston 128 due to the increased pressure existing within compartment 172 and the reduced pressure existing within compartment 174. The holding force is thereby overcome at a predetermined value of the upwardly directed force, which predetermined value is dependent on the prestress provided in the helical compression spring 196. As will be appreciated, the predetermined force at which the holding action is overcome is independent of the design parameters of the sealing member 160 and the helical compression spring 162 and can be easily varied by varying the prestress on the helical compression spring 196. According to the invention, the prestress of the helical compression spring 196 is preferably selected at such a value that, when applied to a construction as shown in FIG. 3, the holding (locking) action can be overcome with a small upward swinging force exerted by hand on the lid 82, e.g. at a handle 89.

Although the invention has been described with reference to specific embodiments thereof, many modifications and variations of such embodiments may be made by one skilled in the art without departing from the inventive concepts disclosed. Accordingly, all such modifications and variations are intended to be included within the spirit and scope of the appended claims.

We claim:

1. In a cylinder-and-piston device including (a) a cylinder having an axis and defining a sealed cavity therein; (b) at least one fluid in said cavity; (c) a piston assembly axially movable in said cavity towards and away from a terminal position, and including (1) a piston axially dividing said cavity into first and second compartments, (2) means defining a first passage extending axially across said piston for connecting said first and second compartments when said piston assembly is remote from said terminal position, (3) a piston rod fastened to said piston for joint movement therewith and extending from the piston through said first compartment and axially outward of said cavity, (4) means defining a second passage extending axially across said piston for connecting said first and second compartments, and (5) valve means for closing said second passage in response to movement of said piston assembly away from said terminal position and for opening said second passage in response to movement of said piston assembly towards said terminal position; and (d) locking means in said cavity for closing said first passage when said piston assembly approaches said terminal position, the improvement in said locking means comprising:

means carried by and axially movable with said piston assembly along substantially the total stroke of said piston assembly towards and away from said terminal position defining an opening to said first passage which is directed towards that end of the cylinder which is nearer to said piston assembly when said piston assembly is in said terminal position;

sealing means located within said cylinder on that side of the piston assembly nearer to said terminal position in substantial axial alignment with said opening; and means for axially resiliently supporting at least one of said opening-defining means with respect to said piston assembly and said sealing means with respect to said cylinder such that said sealing means abuts said opening under the action of said resilient means to close said first passage when said piston assembly approaches said terminal position, wherein once said first passage has been closed and said piston assembly is adjacent said terminal position a pressure difference between said first and second compartments results when said piston assembly begins to move away from said terminal position, said pressure difference thereby retaining said piston assembly adjacent said terminal position.

2. The device of claim 1, wherein said sealing means first abuts said opening-defining means when said piston assembly reaches an abutment position axially adjacent said terminal position, said piston assembly thereafter being further axially movable towards said terminal position against the action of said resilient supporting means.

3. The device of claim 2, wherein the improvement in said locking means further comprises means defining a third passage extending axially across said piston for connecting said first and second compartments; and normally-closed pressure relief valve means responsive to the application to the piston assembly of a force sufficient to move the piston assembly in a direction away from said terminal position for opening said third passage at least when said piston assembly is between said abutment position and said terminal position.

4. The device of claim 1, wherein said resilient supporting means axially biases said at least one means into a rest position when said piston assembly is remote from said terminal position, said rest position being defined by abutment means carried by said cylinder.

5. The device of claim 4, wherein said at least one means is said sealing means; and said abutment means is defined by a projection of said cylinder wall extending radially inward of the inner cylindrical face of said cylinder.

6. The device of claim 1, wherein said at least one means axially resiliently supported by said resilient means is said sealing means.

7. The device of claim 6, further comprising means for guiding said sealing means for axial movement within said cylinder.

8. The device of claim 7, wherein said guiding means comprises an axially extending portion of the inner cylindrical face of said cylinder.

9. The device of claim 8, wherein said sealing means includes a fluid passage therethrough radially outside the area of contact of said sealing means with said opening.

10. The device of claim 6, wherein said sealing means includes a generally disc-shaped member.

11. The device of claim 10, wherein said disc-shaped member is provided with an elastic sealing member for abutting said opening when said piston assembly approaches said terminal position.

12. The device of claim 1, wherein said resilient supporting means comprises a helical compression spring.

13. The device of claim 1, wherein said opening and a sealing face of said sealing means lie in planes substantially perpendicular with respect to the axis of the cylinder.

14. The device of claim 1, wherein said terminal position is closely adjacent the axially inner end of said cylinder.

15. The device of claim 1, wherein said at least one fluid comprises a gas under superatmospheric pressure in at least one of said first and second compartments.

16. The device of claim 15, further including a liquid in at least one of said first and second compartments.

17. The device of claim 16, wherein said at least one compartment in which the liquid is contained is that compartment adjacent the end of the cylinder to which the piston assembly is nearer when in said terminal position.

18. The device of claim 1, wherein said second passage is defined by a gap between said piston assembly and the inner cylindrical face of said cylinder, said valve means for said second passage comprising (1) a circular valve member radially engaging the inner cylindrical face of the cylinder and axially engaging a supporting face of said piston assembly, which supporting face is in a plane substantially perpendicular to the axis of the cylinder and faces in the direction away from said terminal position, and (2) a spring member carried by said piston assembly for biasing the circular valve member into contact with said supporting face when said piston assembly is moved away from said terminal position and for permitting said circular valve member to be lifted axially away from said supporting face against the action of said spring member when said piston assembly is moved towards said terminal position, said circular sealing member when engaging said supporting face preventing fluid flow between said first and second compartments through said second passage and when lifted away from said supporting face permitting fluid connection between said first and second compartments.

19. The device of claim 1, wherein the improvement in said locking means further comprises pressure relief valve means, responsive to a force applied axially to said piston assembly sufficient to move the piston assembly in a direction away from said terminal position, for opening a third passage connecting said first and second compartments while said first and second passage are closed.

* * * * *